United States Patent Office 3,477,954
Patented Nov. 11, 1969

3,477,954
PHOSPHONIUM IODIDE COMPLEXES OF THYROXINE, METHODS OF PREPARING SAME, AND METHODS OF PREPARING 3,5,3'-L-TRIIODOTHYRONINE THEREFROM
Harold C. Reynolds, Kankakee, and Donald B. Olsen, Bonfield, Ill., assignors to Armour Pharmaceutical Company, Chicago, Ill., a corporation of Delaware
No Drawing. Filed June 29, 1966, Ser. No. 561,357
Int. Cl. C07c *101/10;* A61k *27/00*
U.S. Cl. 260—519                                10 Claims

ABSTRACT OF THE DISCLOSURE

A method of preparing 3,5,3'-L-triiodothyronine comprising reacting thyroxine (free acid) with a tertiary phosphine in a dipolar aprotic solvent to form a phosphonium iodine complex and thereafter hydrolyzing said complex to form 3,5,3'-L-triiodothyronine.

---

The present invention relates generally to the preparation of phosphonium iodide complexes of thyroxine, the conversion of said complex into a pharmacologically active form of triiodothyronine, namely, 3,5,3'-L-triiodothyronine, a calorigenic agent useful in the treatment and control of body disorders associated with an impairment of the thyroid hormone function, and to compositions based thereupon. More particularly, the invention relates to methods of preparing phosphonium iodide complexes and 3,5,3,'-L-triiodothyronine from thyroxine and thyroxine salts, and to compositions containing 3,5,3'-L-triiodothyronine and thyroxine which are useful therapeutic agents for treating thyroid-deficient animals, especially man.

It is well-known that the great utility of desiccated thyroid, which has been marketed at least since 1913, is brought about by the presence therein of iodinated thyronines, especially 3,5,3'-L-triiodothyronine. Furthermore, desiccated thyroid has for years been a medical standby for the treatment of human body disorders associated with the impairment of thyroid hormone function and until very recently the animal glands from which it is prepared have been in economical and plentiful supply. Now, however, the demand for natural thyroid is inordinately disproportionate to the supply of fresh glands available and it has become imperative that the pharmaceutical industry learn how to obtain the effect of desiccated thyroid by the administration of synthetic products.

Pitt-Rivers and Gross were among the first to attempt to synthesize thyroid substitutes and they have published several articles on their work. One of their efforts is described in U.S. Patent No. 2,823,164, February 11, 1958, which also provides background for the problem. The method they disclose, viz, the iodination of 3,5-diiodothyronine (herein called "$T_2$") to produce 3,5,3'-L-triiodothyronine (herein called "$T_3$"), suffers from the disadvantage that unless all of the $T_2$ is iodinated, a residuum of $T_2$ remains. $T_2$ has little or no therapeutic value in treating the thyroid deficient patient and therefore if permitted to remain with the $T_3$ of Pitt-Rivers and Gross, it exists as foreign matter.

One question in the field of thyroid therapy which is still debated involves the relative effect of the thyroxine (herein called $T_4$) and $T_3$ is desiccated thyroid upon the thyroid deficient patient. There are members of the medican profession who believe that a concentrated $T_3$ administration (free of all $T_4$), such as that advocated by Pitt-Rivers and Gross, is not able to duplicate the effect of administering desiccated thyroid although it is still warranted for use under special circumstances. Other doctors believe that the effect of desiccated thyroid is better obtained by the administration of a synthetic product which contains both $T_3$ and $T_4$ in the approximate proportions to each other exist in a natural thyroid product.

Thus, it is apparent that a need exists for a method of preparing $T_3$ which avoids residual $T_2$ and which, if possible, also permits the production of a synthetic thyroid product which, when desired, can contain both $T_3$ and $T_4$ in preselected ratios, preferably duplicating the measured ratio of these agents in natural thyroid products.

A mixture containing about one part $T_3$ to about four parts $T_4$ is believed to simulate the metabolic effects of normal thyroid secretion.

The present invention is based upon our discovery of a new and useful method for preparing 3,5,3'-L-triiodothyronine which not only provides 3,5,3'-L-triiodothyronine of excellent quality by the selective deiodination of thyroxine, but which also can be controlled to provide a preselected amount of unreacted thyroxine ($T_4$) in the final product so as to substantially duplicate the $T_3:T_4$ ratio of desiccated thyroid and thereby produce our product of choice. Further, we have found that such effect can be obtained within $T_4:T_3$ ratios of from about 3.5:1 to about 8:1.

Our present invention is further predicated upon our discovery of novel phosphonium iodide complexes of thyroxine, and the preparation thereof, which complexes have great utility in the preparation of useful synthetic thyroid products.

Accordingly, a principal object of the present invention is to provide a method of producing a pharmacologically active iodinated thyronine, namely, 3,5,3'-L-triiodothyronine, which may contain preselected and controlled amounts of thyroxine and which has great clinical utility as a replacement for desiccated thyroid in the prevention or treatment of goiter, both nodular and non-nodular, and which is of particular utility for the treatment of disorders associated with thyroid deficiencies, cretinism, myxedema as well as a variety of clinical conditions associated with subclinical hypothyroidism.

Another principal object of the present invention is to provide new and useful phosphonium iodide complexes of thyroxine and methods of preparing these complexes.

Still another object of the present invention is to provide a method for producing substantially pure 3,5,3'-L-triiodothyronine from a phosphonium iodide complex of thyroxine.

A further object of the present invention is to provide a process for producing products containing relative proportions of synthetic active components to substantially simulate the ratios of the corresponding natural components as they occur in normal thyroid secretions or in natural desiccated thyroid; which products simulate substantially all of metabolic characteristics of normal thyroid secretion or of natural desiccated thyroid; and which process achieves, inter alia, the preparation in situ of such properly proportioned products.

Still a further object of the present invention is to provide a new and useful process which is capable of producing a product comprising substantially pure 3,5,3'-L-triiodothyronine and which product is free of both $T_2$ and $T_4$.

These, and still further objects as shall hereinafter appear, are readily fulfilled in a remarkably unexpected fashion by our invention as will be readily discerned from the following detailed description of embodiments which are exemplary thereof.

As used herein, the terms "3,5,3'-L-triiodothyronine" and "$T_3$" are used interchangeably to define that iodinated thyronine compound having the structure

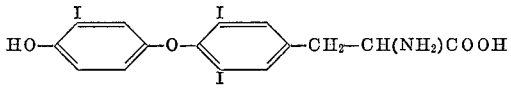

the terms "thyroxine" and "$T_4$" are used interchangeably to define that iodinated thyronine compound having the structure

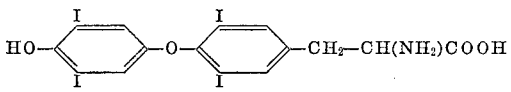

In the practice of the present invention, we find that thyroxine or the sodium salt of thyroxine provide the most commercially practicable starting material for our process. Of course, when we start with the sodium salt of thyroxine, we convert the salt to thyroxine using known technology such, for example, as by reacting the salt with glacial acetic acid in the presence of water to form a slurry. Next, this slurry is filtered and the resulting filter cake is washed with water. This washed cake is then dried under vacuum at 80°–100° C. and is thyroxine (free acid).

Generally speaking, our process may be performed in two steps.

In the first step, thyroxine is reacted with a tertiary phosphine selected from the group consisting of trialkyl phosphine, tri (alkylaryl) phosphine and triaryl phosphine to form a phosphonium iodide complex of thyroxine.

In this step, phosphine can be represented by $(R_1R_2R_3)P$ wherein $R_1$ and $R_2$ and $R_3$ each may be either alkyl or aryl. Preferably, though not necessarily, $R_1$, $R_2$ and $R_3$ will be the same moiety as in Tri-n-butylphosphine, Tri-m-octylphosphine, Tri-phenylphosphine and the like.

In practice, it has been found especially desirable to use an alkyl having one to four carbons, for example, methyl, ethyl, propyl, i-propyl, butyl. Our alkyl reagent of choice, by virtue of its relative low cost and availability is tributyl phosphine.

Tertiary phosphines containing aryls selected from the group comprising phenyl, substituted phenyl and methyl toluene are highly satisfactory. It does not appear to be significant what moiety is used as the substituent on the phenyl since this linkage remains intact throughout the process although moieties which are stable substituents on phenyl include chloro, bromo, fluoro, nitro, amino, methyl, methyoxy, and the like.

Our aryl reagent of choice is triphenyl phosphine.

Step one of our process may be shown by the following notation:

$T_4 + (R_1R_2R_3)P \longrightarrow$

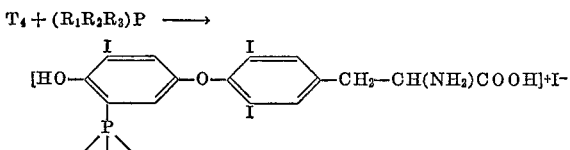

Phosphonium iodide complex

In the next step, the phosphonium iodide complex, so produced is hydrolyzed with water, preferably in the presence of a suitable catalyst such as the hydroxides of alkali or alkaline earth metals, for instance, NaOH, Ca(OH)$_2$, KOH, and the like, to form a reaction product containing 3,5,3'-L-triiodothyronine, ionized hydrogen iodide, and a compound selected from the group consisting of trialkyl phosphine oxide, tri (arylalkyl) phosphine, and triaryl phosphine oxide, the alkyl or aryl identity being dependent upon the phosphine reagent selected for the first step.

This step is shown in the following notation:

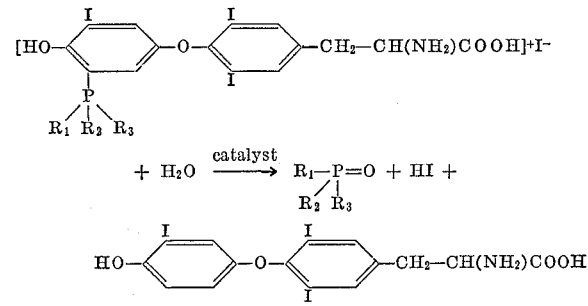

It is, of course, now apparent that if the reagents utilized in step one are provided with a stoichiometric imbalance, that is, if stoichiometrically we provide more thyroxine than can be complexed by the quantity of phosphine introduced into the reaction, then the reaction product will contain a controllable amount of thyroxine, i.e., the stoichiometric excess, in addition to the complex as illustrated.

Thus, when the reaction product of step one, containing both thyroxine and complex, is hydrolyzed according to step two, the final product of step two will contain both $T_4$ and $T_3$ in what ever proportions are indicated by the amounts of the various ingredients employed.

To further aid in understanding the present invention, and not by way of limitation, attention is directed to the following examples.

EXAMPLE I 6.6 gm. (8.3 mmols) sodium thyroxine was stirred for 2 hours with a mixture of 3.0 ml. glacial acetic acid and 30 ml. water. The slurry was filtered and the cake was washed with a few ml. water. The cake was then dried under vacuum at 80–100° C. to 6.1 gm. (7.85 mmols) thyroxine (free acid).

1.25 gm. (1.6 mmols) thyroxine (free acid) was then dissolved in 50 ml. hot dimethyl formamide (DMF). The solution was cooled to 25°, whereupon a gel formed. This gel was added to a solution of 0.450 gm. (1.71 mmols) triphenyl phosphine in 20 ml. DMF. An additional 30 ml. DMF was used to facilitate the transfer of the gel. The mixture of thyroxine, triphenyl phosphine and 100 ml. DMF was then refluxed for 2 hours. The solution was cooled and the DMF was removed by evaporation under vacuum on a steam cone. Residual DMF was removed by evaporation at high vacuum (ca. 1 mm. Hg) at 25°.

The gum remaining in the flask was triturated with 2×50 ml water. The slurry was filtered. (The filtrate was saved.) The cake was treated with benzene and then dried in the air at 25° to 1.60 gm. solid complex.

2.5 gm. sodium hydroxide was dissolved in the above saved filtrate. The dried complex was added to the aqueous alkali and the mixture was heated on the steam cone with occasional shaking. The slurry was cooled to 25° and shaken with 50 ml. ethyl ether. All the solids went into either the ether or aqueous alkali layer. The ether was separated. The aqueous alkali was extracted with an additional 25 ml. ether. The combined ether layers were back-extracted with 10 ml. water. On evaporation of the ether extract, there remained 0.435 gm. crude triphenyl phosphine oxide which, after two crystallizations from cyclohexane, gave a white solid, M.P. 157–159° (lit. reports 156° C.).

The aqueous alkali was acidified with hydrochloric acid to a pH of 4–6. The resulting precipitate was filtered. The cake was dried at high vacuum at 25° to 0.892 gm. mixed iodothyronines (free acid).

The above 0.89 gm. crude product was extracted with 3×50 ml. and then 200 ml. boiling 2 N hydrochloric acid. Only a trace of insoluble crude product remained on the filter paper. The acid solution was cooled. The precipitate which formed was concentrated in a centrifuge, washed with a saturated salt solution and dried to 0.54 gm. (0.79 mmol) product. Thin-layer chromatography of this product compared with authentic samples of thyroxine ($T_4$), triiodothyronine ($T_3$) and diiodothyronine ($T_2$), indicated that it was pure $T_3$ and contained no $T_2$ or $T_4$. 140 mg. of this product was repurified by solution in 2 N hydrochloric acid and crystallized to triiodothyronine hydrochloride.

Literature

Calculated: Rotation, +21.5; M.P., 202–203°; C, 26.2%; H, 1.90%; N, 2.04%; I, 55.4%; Cl, 5.17%. Found: Rotation, +13.8; M.P., 195°; C, 26.43%; H, 2.03%; N, 2.15%; I, 55.32%; Cl, 4.91%.

EXAMPLE II 1.62 gm. (2.08 mmols) thyroxine (free acid) was dissolved in 100 ml hot DMF. The solution was cooled to 25° whereupon a cloud formed. Stirring was continued overnight to a clear solution. 0.196 gm. (0.75 mmol) triphenyl phosphine was dissolved in 5 ml. DMF and added dropwise to the thyroxine solution. The mixture was heated to 50–55° and held at this temperature for 19 hours. 10 ml. water was added to the solution and the water and DMF were evaporated off under house-vacuum on the steam cone. A blanket of nitrogen gas was maintained over the evaporating solution. 50 ml. xylene was added to the flask and evaporated. The contents of the flask were dissolved in 25 ml. methyl alcohol. 10 ml 1N sodium hydroxide solution was added to the flask, and the slurry was refluxed 15 minutes. 100 ml. water was added to the flask. The methanol was evaporated off and the slurry was cooled to 25°. The slurry was extracted with 2×100 ml ethyl ether. The ether extract was discarded. The aqueous extract was adjusted to a pH of 8.6 with hydrochloric acid. The precipitate which formed was concentrated in a centrifuge. The supernatant was decanted and the cake reconstituted in 25 ml. saturated salt solution. The slurry was concentrated in a centrifuge and the supernatant was decanted. The cake was dried under high vacuum at 25° to 0.55 gm. Thin-layer chromatography of this product indicated a $T_4/T_3$ ratio of 2.3/1. The product contained 0.30 gm. (0.375 mmol) $T_4$, 0.13 gm. (0.19 mmols) $T_3$ and 0.12 gm. sodium chloride.

Analysis of this product indicated it contained 23.5% sodium chloride. The product had the following analysis:

Calculated ($T_4/T_3=2.3$): C, 18.4%; H, 1.09%; I, 47.7%. Found: C, 18.54%; H, 1.28%; I, 47.7%.

EXAMPLE III

The procedure of Example II was repeated with 1.62 gm. (2.08 mmols) of thyroxine and 1.6 gm. (0.57 mmol) triphenyl phosphine. About 0.45 gms. of product was formed having at $T_4:T_3$ ratio of 3.5:1.

EXAMPLE IV

The procedure of Example II was repeated with 1.62 gms. (2.08 mmols) of thyroxine and 0.86 (0.31 mmol) of triphenyl phosphine. About 0.5 gms. of product was formed having at $T_4:T_3$ ratio of 8:1.

EXAMPLE V 710 mg. of thyroxine (acid free) was mixed into 30 ml. DMF and heated, with stirring, to about 80° C. and the mixture was cooled to room temperature. 0.25 ml. of tributyl phosphine was added to the mixture and resulting material was covered and stirred for 20 hours at room temperature (25° C.).

The material was then evaporated under vacuum to leave a thick brown oil. To this oil was added 100 ml. of water and 2 g. of sodium hydroxide. This was then heated in a steam bath for about 30 minutes, with occasional stirring, and then cooled to room temperature. At this point, the aqueous phase was decanted through filter paper and an oily residue remained in the decanter and on the filter paper.

The filtrate is acidified to pH 6 with a mixture of 1 part HCl to 3 parts water (v./v.).

The precipitate was spun down in a centrifuge tube and the supernatant was decanted and discarded. The precipitate was dried in a vacuum desiccator at 1 mm. Hg.

490 m. of dry crude product was thus produced which was then extracted with 3×50 ml. and then 200 ml. of boiling 2 N hydrochloric acid. Only a trace of insoluble crude product remained on the filter paper.

The acid solution was then cooled and the precipitate which formed was concentrated in a centrifuge, washed with a saturated salt solution and dried. Thin-layer chromatography indicated that the product was pure $T_3$ and contained no $T_2$ or $T_4$.

EXAMPLE VI

As is well known, the currently preferred form for marketing 3,5,3'-triiodothyronine and thyroxine for human therapeutical use is as the sodium salt. The conversion of pure $T_3$ and $T_4$ into the sodium salt is readily accomplished and is illustrated by this example.

8.4 gm. (13 mmols) of $T_3$, prepared according to Example V, is dissolved in 200 ml. boiling 2 N sodium carbonate. The clear solution is cooled to room temperature. The supernatant aqueous ethanol is discarded. The solid which forms is collected in a low-speed centrifuge. The supernatant is discarded. The solid is sodium liothyronine (the sodium salt of 3,5,3'-triiodothyronine) and is stirred with 2 volumes of 3 A denatured ethanol and centrifuged. The supernatant aqueous ethanol is discarded. The solid is then stirred with 2 volumes of dimethoxyethane and collected on a Buchner funnel. The final cake is dried at 100° C. at 29 inches vacuum to a constant weight and yields 6 gm. (8.9 mmols) sodium liothyronine.

In the foregoing examples, we have illustrated our tertiary phosphine with tributyl phosphine and triphenyl phosphine. Our experience with the reaction, however, leads us to believe that any tertiary phosphine will perform in the process. Thus, the only criteria in selecting the tertiary phosphine is its cost and availability. A list of tertiary phosphines which are considered suited for the practice of our process appears at pages 31–37 under the heading "3. Tertiary Phosphines" in the book by Gennady M. Kosolapoff entitled "Organophosphorus Compounds," Copyright 1950, John Wiley Sons, New York (Library of Congress, Call Number: QD142.Pl. K84).

The therapeutic effect of administering $T_3$ along to thyroid deficient patients has been documented in the literature and needs no further submissions here.

The below example represents an evaluation of various combinations of synthetic $T_4$ and $T_3$ which were formulated to simulate endogenously secreted thyroid hormones at the Harvard Medical School and reported by Drs. Wool and Selenkow in Vol. 6, No. 6 of Clinical Pharmacology and Therapeutics.

EXAMPLE VII

Twenty-one patients with primary myxedema were treated on an out-patient basis. They were carefully selected to ensure clinical and laboratory athyreosis. Thyroid parameters in the untreated state included a mean PBI level of 1.3 mcg. percent (range 0.4 to 2.8 mcg. percent) and a mean serum cholesterol level of 377 mg. percent (range 191 to 522 mg. percent).

Each patient served as his own control and was treated with one of several combinations containing sodium L-thyroxine, 100–300 mcg. daily (97–291 mcg. L-thyroxine) and L-triiodothyronine, 0 to 25 mcg. daily. The combinations used in this evaluation were prepared by physically admixing various amounts of synthetic sodium L-thyroxine (Synthroid brand, Flint Laboratories, Morton Grove, Illinois) and synthetic L-triiodothyronine (Cytomel brand, Smith, Kline & French Laboratories, Philadelphia, Pa.).

At the end of each treatment period, the patients were evaluated clinically and serum was obtained for determinations of PBI (normal range 3.5 to 8.0 mcg. percent), cholesterol (normal range 150–250 mcg. percent) and Resin-$T_3$ uptake (normal range 25–35 percent at 25° C.). Basal metabolic rate (BMR) determinations were performed in selected instances. Each combination was continued for a minimum of 6 weeks, but periods of 8 weeks or more were usually observed before changing dosages. The test samples of L-thyroxine and L-triiodothyronine were formulated to be calorigenically equivalent to 180 mg. of a potent porcine preparation of USP thyroid (desiccated thyroid, USP, Armour). In athyreotic patients, the average daily replacement dose of sodium L-thyroxine required to maintain clinical euthyroidism is approximately 300 to 400 mcg. and that of L-triiodothyronine is about 75 to 125 mcg. For simplicity, each combination is designated as the ratio of the microgram content of each synthetic hormone; e.g., 150/50 indicates 150 mcg. sodium L-thyroxine and 50 mcg. L-triiodothyronine.

While it is difficult to measure precisely what has been termed "clinical euthyroidism," patients in this study were considered clinically euthyroid on each combination of L-thyroxine and L-triiodothyronine if they evidenced no signs or symptoms of thyroid lack or excess. Cholesterol, Resin-$T_3$, and selected basal metabolic rates were used to substantiate the clinical appraisal of euthyroidism.

Similar regimens were administered to 6 patients with well-documented panhypopituitarism as well as to selected groups of patients with nontoxic goiter and with hyperthyroidism treated with antithyroid-thyroid therapy.

All patients were adjudged clinically and metabolically euthyroid on each combination of L-thyroxine and L-triiodothyronine studied. Mean values for critical parameters of thyroid function at each dosage level are listed in Table I.

TABLE I

| Synthetic combination, $T_4/T_3$ (mcg.) | PBI, Mean ± s.d.[1] | Resin-$T_3$, Mean±s.d.[1] | Cholesterol, Mean±s.d.[1] |
|---|---|---|---|
| Myxedema: | | | |
| 150/25 | 4.3±0.4(2) | 28.6±2.3(2) | 204±17(2) |
| 150/50 | 4.1±0.9(15) | 30.8±2.3(16) | 197±33(16) |
| 200/25 | 6.0±1.3(14) | 31.7±3.5(10) | 186±36(8) |
| 200/50 | 6.8±1.7(22) | 32.3±2.3(20) | 200±34(21) |
| 300/25 | 8.9±1.2(8) | 36.4±3.6(4) | 191±37(8) |
| Panhypopituitarism: | | | |
| 150/25 | 3.9±1.0(2) | 28.6±3.3(2) | 249±35(2) |
| 150/50 | 4.5±0.9(5) | 27.7±3.7(5) | 182±43(5) |
| 200/25 | 7.3±0.8(3) | 34.6±3.6(2) | 177±14(2) |
| 200/50 | 5.6±2.0(6) | 31.4±2.6(5) | 175±37(4) |
| Thyroid insufficienty:[2] | | | |
| 150/25 | 4.1±0.7(4) | 28.6±2.5(4) | 227±26(4) |
| 150/50 | 4.2±0.9(20) | 30.1±2.6(21) | 193±34(21) |
| 200/25 | 6.2±1.2(17) | 32.2±3.5(12) | 184±30(10) |
| 200/50 | 6.5±1.8(28) | 32.1±2.4(25) | 196±35(25) |
| 300/25 | 8.9±1.2(8) | 36.4±3.6(4) | 191±37(8) |

[1] Numbers in parenthesis following the standard deviation of the mean represent the number of observarions.
[2] Combined data (hypothyroidism and panhypopituitarism).

Based upon this data, the daily oral combination of synthetic hormones which will maintain an athyreotic patient in clinical euthyroidism and at the same time give levels of serum PBI, cholesterol, and Resin-$T_3$ uptake in the useful range or normal contains approximately 175 to 200 mcg. L-thyroxine and 25 to 50 mcg. L-triiodothyronine, that is, in ratios of $T_4:T_3$ of from about 3.5:1 to about 8:1.

We know of no reason to suspect that a product prepared by this invention to have the $T_4:T_3$ ratios reported would react any less efficaciously than the physical mixture created and used at Harvard.

From the foregoing it becomes apparent that unique methods of preparing and using 3,5,3'-L-triiodothyronine, phosphonium iodide complexes of thyroxine, and thyroxine have been herein described and illustrated from which it can be discerned that all of the aforestated objectives are fulfilled in a remarkably unexpected fashion. It is, of course, understood that we have presented only illustrative embodiments and such modifications, applications and variations as may readily occur to the artisan when confronted by this disclosure are intended to fall within the spirit of this invention, especially as defined by the scope of the claims appended hereto.

We claim:

1. The method of preparing a therapeutic product containing 3,5,3'-L-triiodothyronine comprising reacting thyroxine with a tertiary phosphine in a dipolar aprotic solvent to form a tertiary phosphonium iodide complex, and hydrolyzing said complex to form 3,5,3'-L-triiodothyronine.

2. The method of claim 1 in which said tertiary phosphine has the formula $R_1R_2R_3$ P wherein $R_1$, $R_2$, and $R_3$ are the same or different moieties and are selected from alkyl or aryl.

3. The method according to claim 2 in which said tertiary phosphine is tri-n-butylphosphine, tri-n-octylphosphine or triphenyl phosphine.

4. The method of claim 1 wherein a preselected amount, less than a stoichiometric amount, of tertiary phosphine is added to said thyroxine and said product contains thyroxine and 3,5,3'-L-triiodothyronine in a preselected ratio to each other.

5. The method of claim 4 in which said preselected ratio of $T_4:T_3$ is from about 3.5:1 to about 8:1.

6. The complex having the formula:

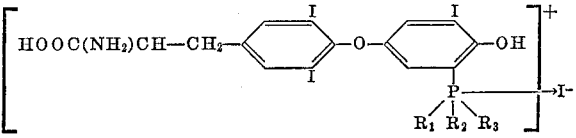

wherein $R_1$, $R_2$, and $R_3$ are as defined in claim 2.

7. The complex of claim 6 in which $R_1$, $R_2$ and $R_3$ are phenyl.

8. The complex of claim 6 in which $R_1$, $R_2$ and $R_3$ are butyl.

9. The method of preparing a therapeutic product containing 3,5,3'-L-triiodothyronine comprising hydrolyzing a tertiary phosphonium iodide complex having the formula

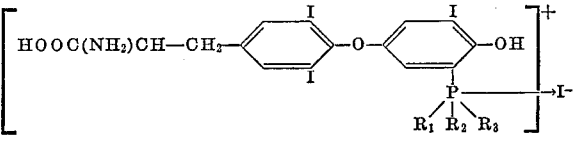

wherein $R_1$, $R_2$ and $R_3$ are the same or different moieties and are selected from alkyl or aryl.

10. The method of claim 9 wherein said complex is admixed with a preselected amount of thyroxine and the product of hydrolysis consists of 3,5,3'-L-triiodothyronine and thyroxine in a ratio to each other controllable by the preselection of said amount.

References Cited

UNITED STATES PATENTS 3,374,269   3/1968   Langer _____ 260—519

LORRAINE A. WEINBERGER, Primary Examiner

L. A. THAXTON, Assistant Examiner

U.S. Cl. X.R.

260—999